(12) United States Patent
Hakkani-Tur et al.

(10) Patent No.: US 10,878,009 B2
(45) Date of Patent: *Dec. 29, 2020

(54) TRANSLATING NATURAL LANGUAGE UTTERANCES TO KEYWORD SEARCH QUERIES

(71) Applicant: Microsoft Technology Licensing, LLC, Redmond, WA (US)

(72) Inventors: Dilek Zeynep Hakkani-Tur, Los Altos, CA (US); Gokhan Tur, Los Altos, CA (US); Rukmini Iyer, Los Altos, CA (US); Larry Paul Heck, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

This patent is subject to a terminal disclaimer.

(21) Appl. No.: 16/043,304

(22) Filed: Jul. 24, 2018

(65) Prior Publication Data
US 2018/0329918 A1 Nov. 15, 2018

Related U.S. Application Data

(63) Continuation of application No. 14/733,188, filed on Jun. 8, 2015, now Pat. No. 10,061,843, which is a
(Continued)

(51) Int. Cl.
*G06F 16/33* (2019.01)
*G06N 20/00* (2019.01)
(Continued)

(52) U.S. Cl.
CPC .... *G06F 16/3332* (2019.01); *G06F 16/24522* (2019.01); *G06F 16/3329* (2019.01);
(Continued)

(58) Field of Classification Search
CPC . G06F 16/9566; G06F 16/243; G06F 16/3329
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101339551 A 1/2009
CN 101254344 B 6/2010
(Continued)

OTHER PUBLICATIONS

"Non Final Office Action Issued in U.S. Appl. No. 14/856,139", dated Dec. 10, 2018, 13 Pages.
(Continued)

*Primary Examiner* — Etienne P Leroux

(57) ABSTRACT

Natural language query translation may be provided. A statistical model may be trained to detect domains according to a plurality of query click log data. Upon receiving a natural language query, the statistical model may be used to translate the natural language query into an action. The action may then be performed and at least one result associated with performing the action may be provided.

20 Claims, 7 Drawing Sheets

Related U.S. Application Data continuation of application No. 13/592,638, filed on Aug. 23, 2012, now Pat. No. 9,064,006.

(51) Int. Cl.
  *G06F 16/84* (2019.01)
  *G06F 16/951* (2019.01)
  *G06F 16/332* (2019.01)
  *G06F 16/2452* (2019.01)
  *G06F 40/44* (2020.01)

(52) U.S. Cl.
  CPC ...... *G06F 16/3334* (2019.01); *G06F 16/3338* (2019.01); *G06F 16/3344* (2019.01); *G06F 16/84* (2019.01); *G06F 16/951* (2019.01); *G06F 40/44* (2020.01); *G06N 20/00* (2019.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,963,940 A | 10/1999 | Liddy et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,111,580 A | 8/2000 | Kazama et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,345,111 B1 | 2/2002 | Yamaguchi et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,434,520 B1 | 8/2002 | Kanevsky et al. |
| 6,476,834 B1 | 11/2002 | Doval et al. |
| 6,496,598 B1 | 12/2002 | Harman |
| 6,503,195 B1 | 1/2003 | Keller et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,757,362 B1 | 6/2004 | Cooper et al. |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 7,003,134 B1 | 2/2006 | Covell et al. |
| 7,027,974 B1 | 4/2006 | Busch et al. |
| 7,028,269 B1 | 4/2006 | Cohen-Solal et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,259,747 B2 | 8/2007 | Bell |
| 7,348,963 B2 | 3/2008 | Bell |
| 7,359,121 B2 | 4/2008 | French et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |

(56) References Cited

U.S. PATENT DOCUMENTS

| | | |
|---|---|---|
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,647,228 B2 | 1/2010 | Silvera et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,710,391 B2 | 5/2010 | Bell et al. |
| 7,725,322 B2 | 5/2010 | Kwak et al. |
| 7,729,530 B2 | 6/2010 | Antonov et al. |
| 7,746,345 B2 | 6/2010 | Hunter |
| 7,747,601 B2 | 6/2010 | Cooper et al. |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| 7,873,532 B2 | 1/2011 | Jones et al. |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,073,681 B2 | 12/2011 | Baldwin et al. |
| 8,265,939 B2 | 9/2012 | Kanevsky et al. |
| 8,352,245 B1 | 1/2013 | Lloyd |
| 8,355,914 B2 | 1/2013 | Joh et al. |
| 8,433,559 B2 | 4/2013 | Madan |
| 8,468,019 B2 | 6/2013 | Rempel |
| 8,521,786 B2 | 8/2013 | Black et al. |
| 8,880,406 B2 | 11/2014 | Santos-Lang et al. |
| 8,881,122 B1 | 11/2014 | Klimek et al. |
| 8,898,163 B2 | 11/2014 | Banerjee et al. |
| 9,244,984 B2 | 1/2016 | Heck et al. |
| 9,286,910 B1 | 3/2016 | Li et al. |
| 9,298,287 B2 | 3/2016 | Heck et al. |
| 9,454,962 B2 | 9/2016 | Tur et al. |
| 9,760,566 B2 | 9/2017 | Heck et al. |
| 9,842,168 B2 | 12/2017 | Heck et al. |
| 9,858,343 B2 | 1/2018 | Heck et al. |
| 10,049,667 B2 | 8/2018 | Heck et al. |
| 10,296,587 B2 | 5/2019 | Heck et al. |
| 2002/0059289 A1 | 5/2002 | Wenegrat et al. |
| 2003/0130837 A1 | 7/2003 | Batchilo et al. |
| 2007/0047719 A1 | 3/2007 | Dhawan et al. |
| 2007/0055508 A1 | 3/2007 | Zhao et al. |
| 2007/0174343 A1 | 7/2007 | Fortuna |
| 2007/0299798 A1 | 12/2007 | Suyama et al. |
| 2008/0026838 A1 | 1/2008 | Dunstan et al. |
| 2008/0294628 A1 | 11/2008 | Shoval et al. |
| 2009/0006389 A1* | 1/2009 | Piscitello ............ G06F 16/9566 |
| 2009/0008398 A1 | 1/2009 | Nakatsuji et al. |
| 2009/0089128 A1 | 4/2009 | Tkatch et al. |
| 2009/0119587 A1 | 5/2009 | Allen et al. |
| 2009/0135740 A1 | 5/2009 | Dhara et al. |
| 2009/0187402 A1 | 7/2009 | Scholl |
| 2009/0248659 A1* | 10/2009 | McCool ............ G06F 16/3329 |
| 2009/0327889 A1 | 12/2009 | Jeong et al. |
| 2010/0005081 A1 | 1/2010 | Bennett |
| 2010/0070517 A1 | 3/2010 | Ghosh et al. |
| 2010/0095206 A1 | 4/2010 | Kim |
| 2010/0112189 A1 | 5/2010 | Yu |
| 2010/0235341 A1* | 9/2010 | Bennett ................ G06F 16/243 |
| | | 707/706 |
| 2010/0308398 A1 | 12/2010 | Shin et al. |
| 2010/0312779 A1 | 12/2010 | Lim et al. |
| 2011/0010367 A1 | 1/2011 | Jockish et al. |
| 2011/0047149 A1 | 2/2011 | Vaananen |
| 2011/0063301 A1 | 3/2011 | Setlur et al. |
| 2011/0087670 A1 | 4/2011 | Jorstad et al. |
| 2011/0208800 A1 | 8/2011 | Nicks |
| 2012/0016678 A1 | 1/2012 | Gruber et al. |
| 2012/0082353 A1 | 4/2012 | Kelusky et al. |
| 2013/0241834 A1 | 9/2013 | Vennelakanti et al. |
| 2014/0074629 A1 | 3/2014 | Rathod |
| 2016/0140228 A1 | 5/2016 | Cohen et al. |
| 2017/0038097 A1 | 2/2017 | Ni et al. |

FOREIGN PATENT DOCUMENTS

| | | |
|---|---|---|
| EP | 357909 A1 | 3/1990 |
| EP | 583061 A2 | 2/1994 |
| EP | 919906 A2 | 6/1999 |
| EP | 2122542 A1 | 11/2009 |
| JP | H0844490 A | 2/1996 |
| JP | 2010538375 A | 12/2010 |
| WO | 9310708 A1 | 6/1993 |
| WO | 9519031 A1 | 7/1995 |
| WO | 9717598 A1 | 5/1997 |
| WO | 9803907 A2 | 1/1998 |
| WO | 9942920 A1 | 8/1999 |
| WO | 9944698 A2 | 9/1999 |
| WO | 0073995 A2 | 12/2000 |
| WO | 2008100690 A1 | 8/2008 |
| WO | 2012135210 A2 | 10/2012 |

OTHER PUBLICATIONS

"Non Final Office Action Issued in U.S. Appl. No. 15/271,859", dated Nov. 29, 2018, 49 Pages.

"Non Final Office Action Issued in U.S. Appl. No. 15/818,432", dated Jan. 25, 2019, 23 Pages.

Allen, et al., "An Architecture for More Realistic Conversational Systems", In Proceedings of the 6th international conference on Intelligent user Interfaces, Jan. 14, 2001, 8 Pages.

"Office Action Issued in Korean Patent Application No. 10-20137025578", dated Nov. 30, 2018, 4 Pages.

"Office Action Issued in European Patent Application No. 12763913.6", dated Jan. 14, 2019, 8 Pages.

"Office Action Issued in Korean Patent Application No. 10-2013-7025578", dated May 17, 2019, 9 Pages.

"Office Action Issued in Korean Patent Application No. 10-2013-7025540", dated Jul. 13, 2018, 6 Pages.

"Office Action Issued in Korean Patent Application No. 1020137025586", dated May 21, 2018, 12 Pages.

"Office Action Issued in European Patent Application No. 12763866.6", dated Jun. 27, 2018, 8 Pages.

"Office Action Issued in European Patent Application No. 12764494.6", dated Apr. 6, 2018, 6 Pages.

"Office Action Issued in European Patent Application No. 12764853.3", dated Jul. 12, 2018, 9 Pages.

Zhao, Liang, "Dressed Human Modeling, Detection, and Parts Localization", In the Doctoral Dissertation in the Robotics Institute, Carnegie Mellon University, Pittsburgh, PA, Jul. 2001, 121 Pages.

"Office Action Issued in European Patent Application No. 12765100.8", dated Jul. 18, 2018, 10 Pages.

"Office Action Issued in European Patent Application No. 12765896.1", dated Aug. 20, 2018, 7 Pages.

"Office Action Issued in U.S. Appl. No. 13/077,431", dated May 22, 2018, 20 Pages.

"Office Action Issued in European Patent Application No. 13739555.4", dated Nov. 2, 2015, 6 Pages.

"Final Office Action Issued in U.S. Appl. No. 14/856,139", dated Jun. 21, 2018, 19 Pages.

(56) References Cited

OTHER PUBLICATIONS

"Final Office Action Issued in U.S. Appl. No. 15/271,859", dated Jul. 13, 2018, 63 Pages.
"Non Final Office Action Issued in U.S. Appl. No. 15/620,567", dated Jul. 13, 2018, 8 Pages.
"Final Office Action Issued in U.S. Appl. No. 15/818,432", dated Sep. 27, 2018, 26 Pages.
"Office Action Issued in Chinese Patent Application No. 201210091176.3", dated May 25, 2016, 23 Pages.
"Office Action and Search Report Issued in Chinese Patent Application No. 201380035865.5", dated Dec. 23, 2016, 13 Pages.
Aggarwal, et al., "Human Motion analysis", In Proceedings of Computer Vision and Image Understanding, vol. No. 73, Issue No. 3, Mar. 1, 1999, 13 Pages.
Azarbayejani, et al, "Visually Controlled Graphics", In Proceedings of the IEEE Transactions on Pattern Analysis and Machine Intelligence, vol. 15, Issue 6, Jun. 1, 1993, 4 Pages.
Breen, et al., "Interactive Occlusion and Collusion of Real and Virtual Objects in Augmented Reality", In Journal European Computer Industry Research Center, Jan. 1995, 22 Pages.
Brogan, et al., "Dynamically Simulated Characters in Virtual Environments", In Proceedings of the IEEE Computer Graphics and Applications, vol. 18, Issue 5, Sep. 1998, pp. 58-69.
Fisher, et al., "Virtual Environment Display System", In Proceedings of ACM Workshop on Interactive 3D Graphics, Jan. 1, 1998 12 Pages.
Freeman, et al., "Television Control by Hand Gestures", In International Workshop on Automatic Face and Gesture Recognition, Jun. 26, 1994, 7 Pages.
Fukumoto, et al., "Finger-Pointer: Pointing Interface by Image Processing", In Journal Computers and Graphics, vol. 18, Issue 5, May 1994, pp. 633-642.
Granieri, et al., "Simulating Humans in VR", In the Proceeding of Center for Human Modeling and Simulation, Oct. 12, 1994, 15 Pages.
Sonntag, et al., "SmartWeb Handheld—Multimodal Interaction with Ontological Knowledge Bases and Semantic Web Services", In the Proceeding of Artificial Intelligence for Human Computing, 2007, 8 Pages.
"Summon to Attend Oral Proceedings Issued in European Patent Application No. 12763913.6", Mailed Date: Nov. 19, 2019, 5 Pages.
"First Office Action and Search Report Issued in Chinese Patent Application No. 201610801496.1", dated Mar. 6, 2019, 16 Pages.
"Final Office Action Issued in U.S. Appl. No. 15/271,859", dated Apr. 12, 2019, 53 Pages.
"Summons to Attend Oral Proceedings issued in European Patent Application No. 12764853.3", Mailed Date: Apr. 2, 2019, 10 Pages.
"Summons to Attend Oral Proceedings issued in European Patent Application No. 12765100.8", Mailed Date: Apr. 2, 2019, 11 Pages.
"Second Office Action Issued in Chinese Patent Application No. 2016108/014961", dated Sep. 12, 2019, 5 Pages.
"Non Final Office Action Issued in U.S. Appl. No. 13/077,431", dated Aug. 7, 2019, 13 Pages.
"Summons to Attend Oral Proceedings Issued in European Patent Application No. 12764494.6", Mailed Date: Aug. 7, 2019, 12 Pages.
"Notice of Allowance Issued in U.S. Appl. No. 15/818,432", dated Oct. 17, 2019, 20 Pages.
"Summons to Attend Oral Proceedings Issued in European Patent Application No. 12763866.6", Mailed Date: May 9, 2019, 7 Pages.
"Final Office Action Issued in U.S. Appl. No. 15/818,432", dated May 31, 2019, 25 Pages.
"Final Office Action Issued in U.S. Appl. No. 14/856,139", dated Jul. 1, 2019, 16 Pages.

\* cited by examiner

TRANSLATING NATURAL LANGUAGE UTTERANCES TO KEYWORD SEARCH QUERIES

CROSS-REFERENCE/RELATED APPLICATIONS

This application claims priority to and is a continuation of U.S. patent application Ser. No. 14/733,188, filed Jun. 8, 2015, entitled "TRANSLATING NATURAL LANGUAGE UTTERANCES TO KEYWORD SEARCH QUERIES, now issued U.S. Pat. No. 10,061,843, which is a continuation of U.S. patent application Ser. No. 13/592,638, filed Aug. 23, 2012, entitled "TRANSLATING NATURAL LANGUAGE UTTERANCES TO KEYWORD SEARCH QUERIES, now issued U.S. Pat. No. 9,046,006" This application is related to U.S. patent application Ser. No. 13/106,374, filed on May 12, 2011, entitled "SENTENCE SIMPLIFICATION FOR SPOKEN LANGUAGE UNDERSTANDING, now issued U.S. Pat. No. 9,454,962." each of which is hereby incorporated by reference in their entirety.

BACKGROUND

Conversational, or natural language, questions and speech differ both stylistically and in content from commands and queries given to computers. For example, one person may ask a friend "Is there a good Italian place nearby?" while a search query to a computer may be phrased "Italian restaurant nearby." Conventional approaches to handling keyword search queries depend on reviewing search engine logs to determine which queries correlate to which selected links and using this data to provide those same links when the same queries occur. This approach fails to improve search results for natural language queries, however, because of the tremendous variation in conversational style between users, even when attempting to create the same search parameters.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Natural language query translation may be provided. A statistical model may be trained to detect domains according to a plurality of query click log data. Upon receiving a natural language query, the statistical model may be used to translate the natural language query into an action, such as a search engine query. The action may then be performed and at least one result associated with performing the action may be provided.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
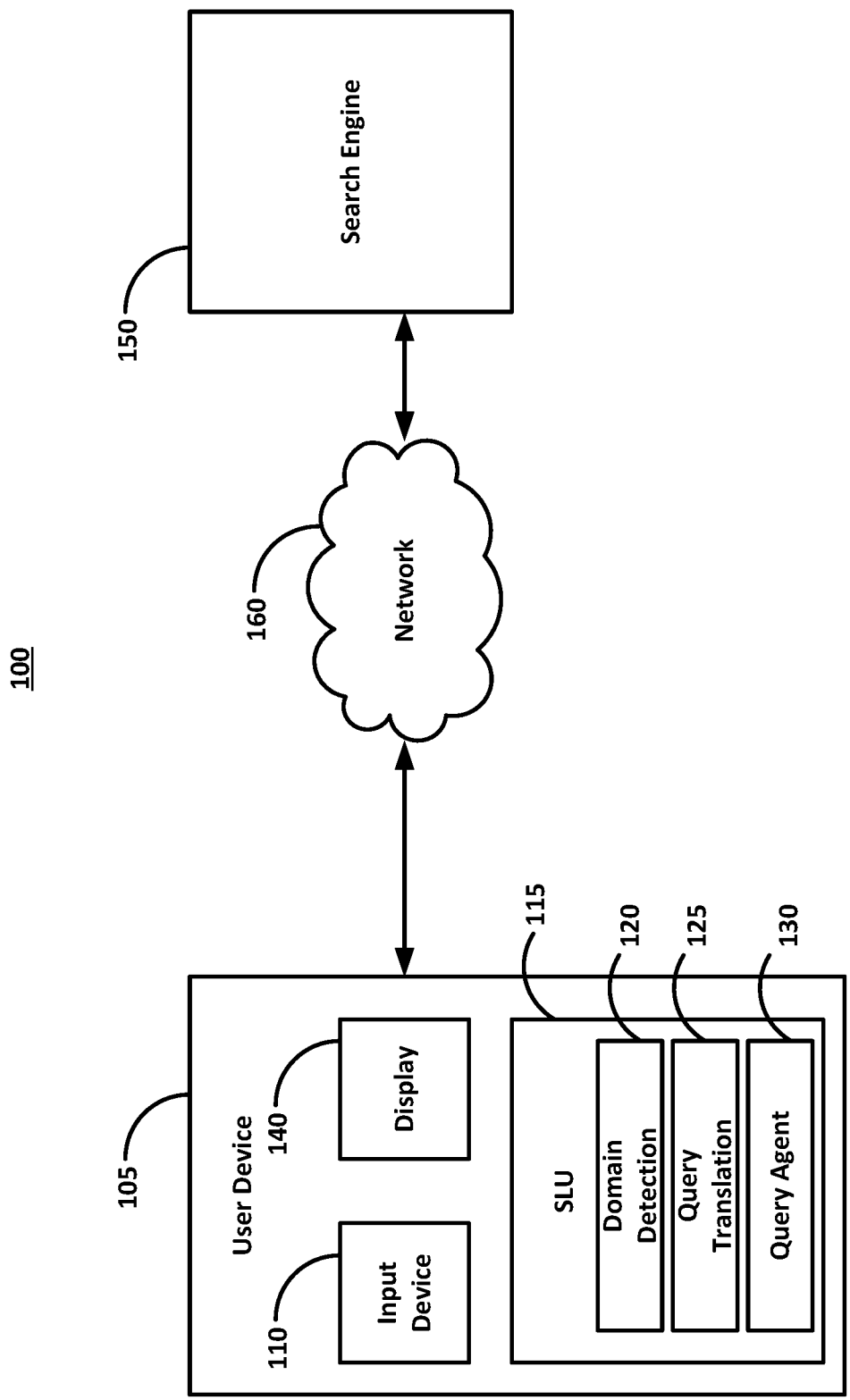
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Spoken language understanding (SLU) in human/machine spoken dialog systems is a process that aims to automatically identify a user's goal-driven intents for a given domain. For example, the user's intent may be to make a dinner reservation, with goals of: (a) locating a restaurant (b) in a particular area (c) with available reservations and (d) for a particular time and date. A query may be expressed in natural language, such as "find me an Italian restaurant nearby with a table for two," and the SLU system may detect a top level domain as an initial classification. In the example query above, the domain may comprise "restaurants."

SLU systems enable users to speak naturally to computers, but the success and broad use of keyword search engines imply the strength of keyword searches. Some users may attempt to speak in keywords, hoping for better machine understanding. SLU systems consistent with embodiments of this disclosure may be capable of handling either style of query that may be received from a user.

Domain detection for a query may be accomplished by parsing the user's query through a statistical model that uses extracted features, such as keywords relating to a user's desired action or intent, to determine a statistically most-likely domain for the query. Such domain detection models may be trained via supervised machine learning methods that use lexical, contextual, and other semantic features. Consistent with embodiments of this disclosure, naturally spoken user queries may be translated into a form similar to keyword search queries. Features extracted from the query may be statistically compared to those extracted from search engine query click logs that capture the behavior of an abundance of users who typed in the same and/or a similar search query.

Search query click log data ("click data") comprises an aggregation of past search engine users' queries and the links these users click from a list of sites returned by the search engine. This click data may be used as implicit supervision to improve future search decisions. The click data may be mined, for example, to train domain detection statistical models when little or no in-domain data was available. Furthermore, the click data may help enrich existing training data sets with new features, such as computing the click distribution over a set of related Uniform Resource Locators (URLs) from search query click logs.

Since the form of natural language queries often differs from shorter keyword search queries, the natural language queries may be transformed into query-like sentences using a syntax-based transformation and domain independent salient phrases (DISPs) learned from multi-domain user utterances. These DISPs may comprise introductory phrases such as "how far is . . . ," "show me . . . ," "what are the . . . ," "find a . . . ," etc. By analyzing queries across multiple domains, it is possible to identify such common salient phrases that identify an incoming query as a natural language query. Once identified, these queries may be processed and/or pre-processed differently than incoming keyword searches. For example the domain-specific portions of the natural language query may be mapped to a similar keyword query.

While these transformations help improve domain detection, the transformed queries may not necessarily be targeted to match the style of keyword search queries. In some embodiments consistent with this disclosure, statistical machine translation (SMT) may operate to translate user utterances to a search query form.

Training for the SMT models may use semantically similar natural language utterances and query pairs that may be mined by walking on a bi-partite query click graph. Search query click logs can be represented as a bi-partite graph with two types of nodes corresponding to queries and URLs. Edges are added to the click graph mapping which URL(s) a user clicks on after providing a particular query. The graph is then searched for queries that include domain independent salient phrases (DISP). These queries represent natural language queries and form a seed set for mining pairs.

Some example natural language/keyword pairs, and their corresponding DISP(s), that may be found in click data shown in Table 1, below. As seen, there are cases where the words or phrases in the input query are translated into other words (e.g., "biggest US companies" is translated into "fortune 500 companies"). Once the NL queries are translated into keyword queries, features for domain detection may be extracted.

TABLE 1

| Natural Language Query | Keyword Query | DISP(s) |
| --- | --- | --- |
| What are the signs of throat cancer? | Throat cancer symptoms | What are the |
| How many calories do I need to eat in a day? | Calories per day | How many I need |
| What are the biggest US companies? | Fortune 500 companies | What are the |
| How do I know if I am anemic? | Anemia | How do I |
| Find me the closest Italian restaurant | Italian restaurant downtown | Find me |

The query click graph identifies a set of keyword queries that are most semantically similar to the natural language (NL) queries. To minimize the computational cost of walking the graph, the URL that has the maximum click probability given the natural language query in question is used and a similarity between the natural language query and a keyword query corresponding to that URL is calculated. The pairs that have the highest similarity form the basis for training SMT models. In short, when the same URL has a high click-through rate for a given NL query and a keyword query, and the semantic similarity between the NL query and keyword query (with or without the DISP included), the pair may be considered a high value pair for training the SMT model. A similar strategy may be used to map any two different types of queries, such as mapping queries in different languages to each other based on common URL click data.

Domain detection may be framed as a classification problem. Given a user's query, the problem is to associate a subset of domains with the query from amongst all possible domains. To solve this classification problem, a class of domains with a maximum conditional probability is selected.

Supervised classification methods may be used to estimate these conditional probabilities, and a set of labeled queries may be used in training a statistical model. These labeled queries may comprise, for example, explicitly human-annotated query click log data and/or implicitly annotated data. Classification may employ lexical features such as word n-grams, contextual features such as a previous query's domain, semantic features such as named entities in the utterance (e.g., specific locations or people), syntactic features such as part-of-speech tags, topical features such as latent semantic variables and so on.

The implicitly annotated data coming from click data may be leveraged as additional features for training domain detection classification models. This is straight-forward in cases where a given user utterance is found in the click data with relatively high frequency, but the language used in natural language queries in an SLU system is different from keyword-based queries. For some domains, such as one where the users are scheduling their own meetings, queries are unlikely to occur in the click data. In this case, the absence of a mapped query in the click data also provides information about the category of an utterance.

Users typically generate different sequences of words according to their intent and depending on whether they interact with a web search engine, another human, or an intelligent SLU system. When they wonder about the "capacity of a Boeing 737," they can form a simple keyword-based query such as "capacity Boeing 737" when interacting with a search engine. When they are interacting with an intelligent SLU system, they may provide a more natural language query, such as "what is the capacity of a Boeing 737 airplane." A syntactic parsing based sentence transformation method may strip domain-independent words and convert this query to "capacity 737," so that the domain classifier can perform better on them.

Such transformed natural language queries are often semantically similar to keyword-based search engine queries. Hence, it is possible to use the URL click distributions for the similar keyword-based query. For example, the natural language query "I need to make a reservation for dinner" may be transformed as "make reservation," and that query may result in clicks to webpages that offer the user the ability to create restaurant reservations. The domain detection can exploit this orthogonal information in addition to the input query. For example, the translated query may be searched in the query click data and the URL click distribution feature may be used to help determine the domain of the input query.

FIG. 1 is a block diagram of an operating environment 100 that may provide natural language query translation. Operating environment 100 may comprise a user device 105 comprising an input device 110, such as a camera and/or microphone. Input device 110 may be coupled to a spoken language understanding module 115 comprising a domain detection module 120, a query translation module 125, and a query agent 130. User device 105 may further comprise a display 140. User device 110 may be operative to communicate with other computing devices, such as transmitting queries from query agent 130 to a search engine 150 via a network 160 and receiving results from search engine 150 for output to display 140.

Figure 2:
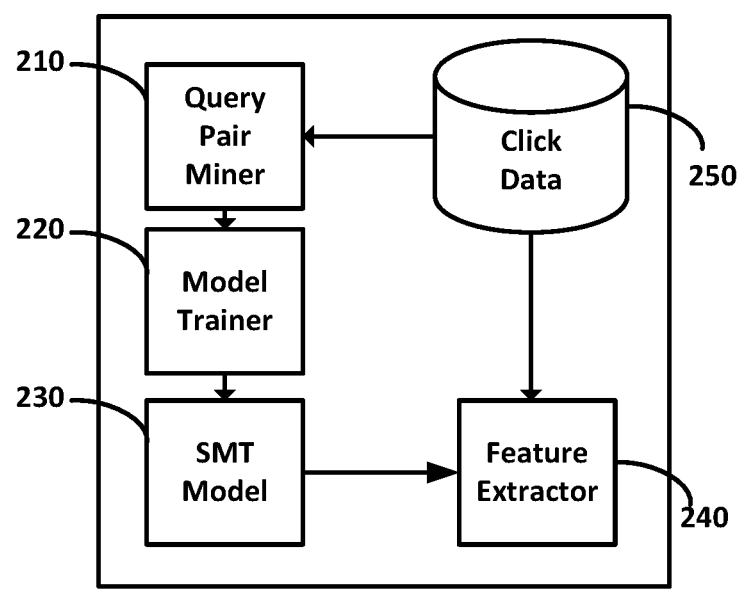
FIG. 2 is an illustration of a query click log graph.

FIG. 2 is a block diagram of a trainer 200 for domain detection module 120. Trainer 200 comprises a query pair miner 210, a model trainer 220, a statistical machine translator (SMT) model 230, a feature extractor 240, and a query click log database 250. Domain detection module 120 may use a set of phrases that are typical of natural language queries referred to as domain independent salient phrases (DISP). Query pair miner 210 may mine semantically similar natural language query and keyword-based search query pairs. Model trainer 220 may use these mined pairs to train SMT model 230 to convert natural language queries to keyword-based queries. Feature extractor 240 may analyze the query pairs and associated uniform resource locators (URLs) from query click logs database 250 for features useful in domain detection.

Newly received queries, such as may be provided by a user via input device 110, may be fed into SMT model 230 to be translated into a keyword-based query, and the natural language/keyword query pair may be checked against the click data from query click log database 250. A set of features may be computed from any click data corresponding to the query pair. If the query pair is not seen in the query click logs, this information is also provided to domain detection module 120, as it may indicate that the input belongs to a domain where there are no queries categorically related to information on the web.

DISPs comprise words and/or phrases that are salient for more than one domain. Available labeled training data from other domains may be used to identify these DISPs. For each n-gram in a data set, a probability distribution over all possible domains and the Kullback-Leibler (KL) divergence between this distribution and the prior probabilities over all domains may be computed. The word n-grams that show the least divergence from the prior distribution may be selected as the domain-independent salient phrases. Such phrases may comprise, for example, "show me all the" or "I want information on" that frequently appear in natural language utterances directed to spoken dialog systems for information access.

Model trainer 220 may use training data consisting of millions of high precision pairs mined as described above. When a natural language query has more than one corresponding query based on a selected threshold, a most frequent keyword-based query may be used. Training data may comprise search engine result data across all searches, and/or may be targeted to specific domains of interest to a particular SLU system. Minimum error rate training (MERT) processes may be used to tune the probability weighting of the training data.

Figure 3:
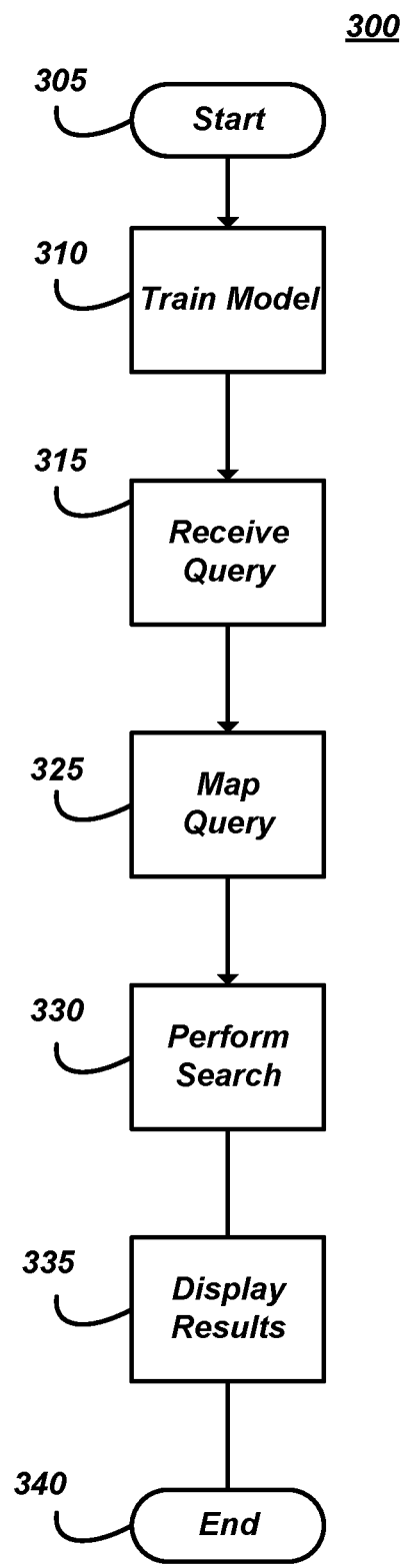
FIG. 3 is a flow chart of a method for providing natural language query translation.

FIG. 3 is a flow chart setting forth the general stages involved in a method 300 consistent with an embodiment of the disclosure for providing natural language query translation. Method 300 may be implemented using a computing device 400 as described in more detail below with respect to FIG. 4. Ways to implement the stages of method 300 will be described in greater detail below. Method 300 begins at starting block 305 and proceeds to stage 310 where computing device 400 may train a statistical machine translation model according to a plurality of mined query pairs. For example, a plurality of domain independent salient phrases (DISPs) may be identified and used to identify a plurality of previous natural language queries according to the plurality of DISPs in a set of query click log data. Each of the identified natural language queries may be associated with a keyword-based query into a mined query pair of the plurality of mined query pairs according to a uniform resource locator (URL) click graph. Such a click graph may comprise a weighted distribution of URLs selected in response to previous natural language queries and previous keyword-based queries. Common features for each of the mined query pairs may also be extracted to aid in domain detection.

Method 300 may then advance to stage 315 where computing device 400 may receive a new query from a user. For example, user device 105 may receive a query such as "what are some good Italian restaurants nearby."

Method 300 may then advance to stage 325 where computing device 400 may map the query into a keyword-based query according to the trained statistical machine translation (SMT) model. For example, SLU module 115 may detect whether the query comprises a natural language query by determining whether the received query comprises any DISPs. Even when the received query is not a natural language query, the SMT model may translate the received query into a different format and/or word order to better correlate with common, previously received queries. For the query "what are some good Italian restaurants nearby," for example, SMT model 230 may identify a query pair associated with locating restaurants that comprises similar extracted features to the newly received query, such as an associated geographic location.

After mapping the natural language query into a keyword-based query at stage 325, or if the new query was determined not to be in natural language form at stage 320, method 300 may advance to stage 330 where computing device 400 may perform the search action. For example, the query may be provided to search engine 150 for execution.

Method 300 may then advance to stage 335 where computing device 400 may provide a plurality of results associated with the search to the user. For example, search engine 150 may return a plurality of URLs according to the search query that may be output to display 140. The URL distribution associated with the mapped keyword-based query may be used to order and/or re-order the results. Method 300 may then end at stage 340.

An embodiment consistent with the invention may comprise a system for providing natural language query translation. The system may comprise a memory storage and a processing unit coupled to the memory storage. The processing unit may be operative to train a statistical model to detect domains according to a plurality of query click log data. Upon receiving a natural language query, the processing unit may be operative to use the statistical model to translate the natural language query into an action. The processing unit may then be perform the action and provide at least one result associated with performing the action.

Another embodiment consistent with the invention may comprise a system for providing natural language query translation. The system may comprise a memory storage and a processing unit coupled to the memory storage. The processing unit may be operative to receive a query from a user, determine whether the query comprises a natural language query, and in response to determining that the query comprises the natural language query, map the natural language query into a keyword-based query, perform a search according to a query pair comprising the natural language query and the keyword-based query, and provide a plurality of results associated with the search to the user.

Yet another embodiment consistent with the invention may comprise a system for providing natural language query translation. The system may comprise a memory storage and a processing unit coupled to the memory storage. The processing unit may be operative to train a statistical machine translation model according to a plurality of mined query pairs, extract a plurality of common features for each of the mined query pairs, receive a new query from a user, and determine whether the new query comprises a new natural language query. In response to determining that the query comprises the natural language query, the processing unit may be operative to map the new natural language query into a keyword-based query according to the trained statistical machine translation model. The processing unit may be further operative to perform a search according to the new query and provide a plurality of results associated with the search to the user.

Figure 4:
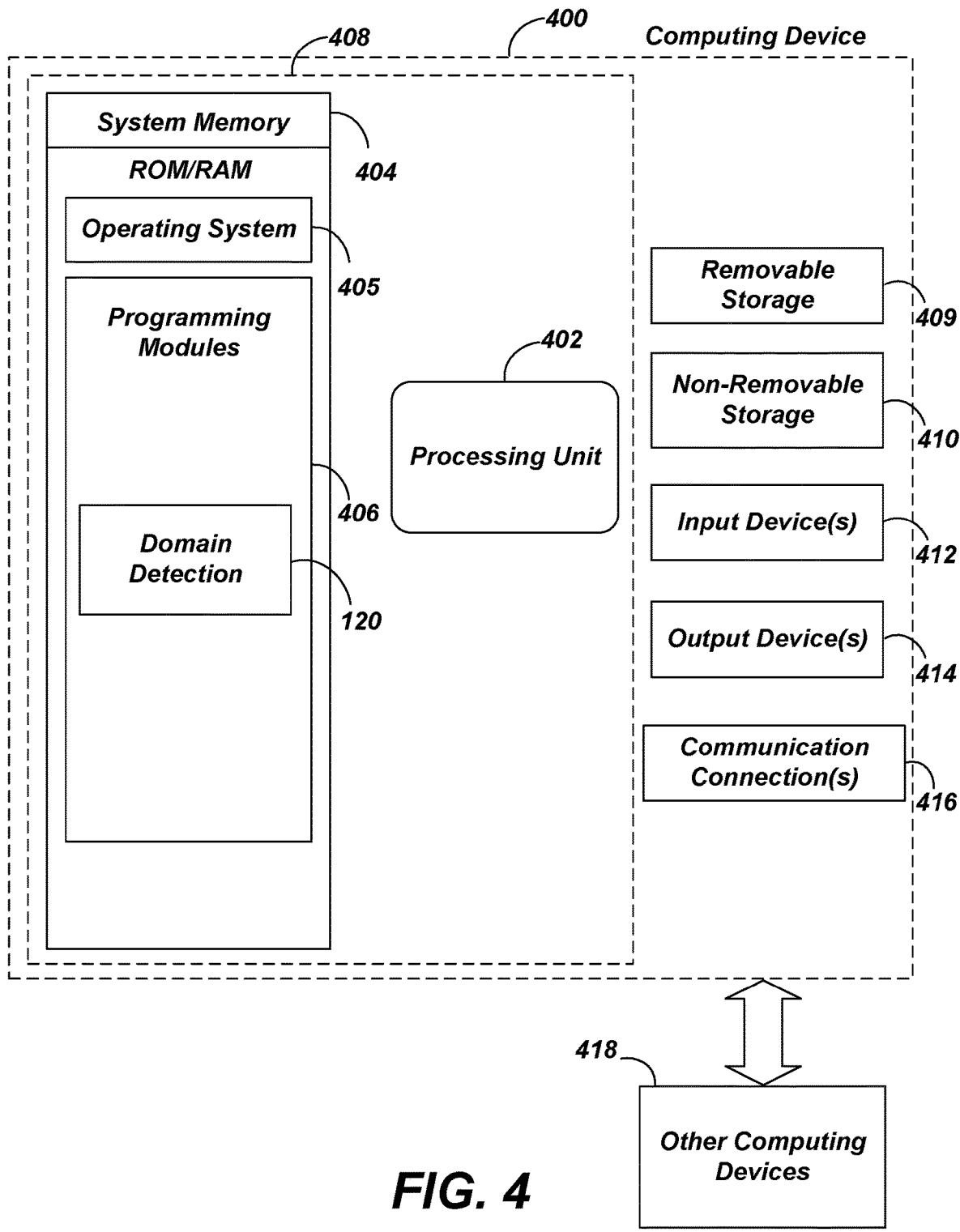
FIG. 4 is a block diagram of a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise user device 100 as described above. Methods described in this specification may operate in other environments and are not limited to computing device 400.

With reference to FIG. 4, a system consistent with an embodiment of the disclosure may include a computing device, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may comprise, for example, domain detection module 120. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., translation API 120) may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 5A:
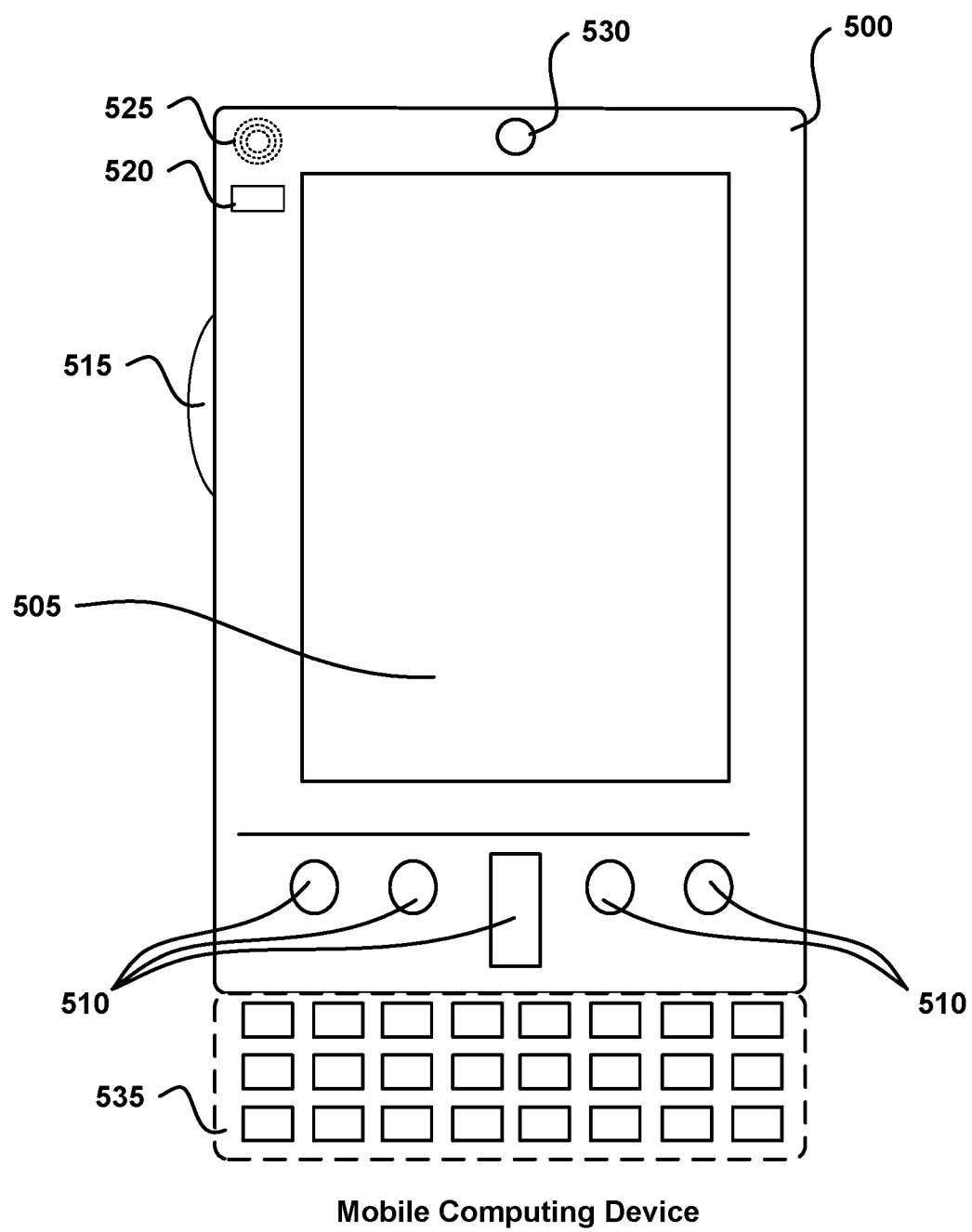
FIGS. 5A-5B are simplified block diagrams of a mobile computing device with which embodiments of the present disclosure may be practiced.
Figure 5B:
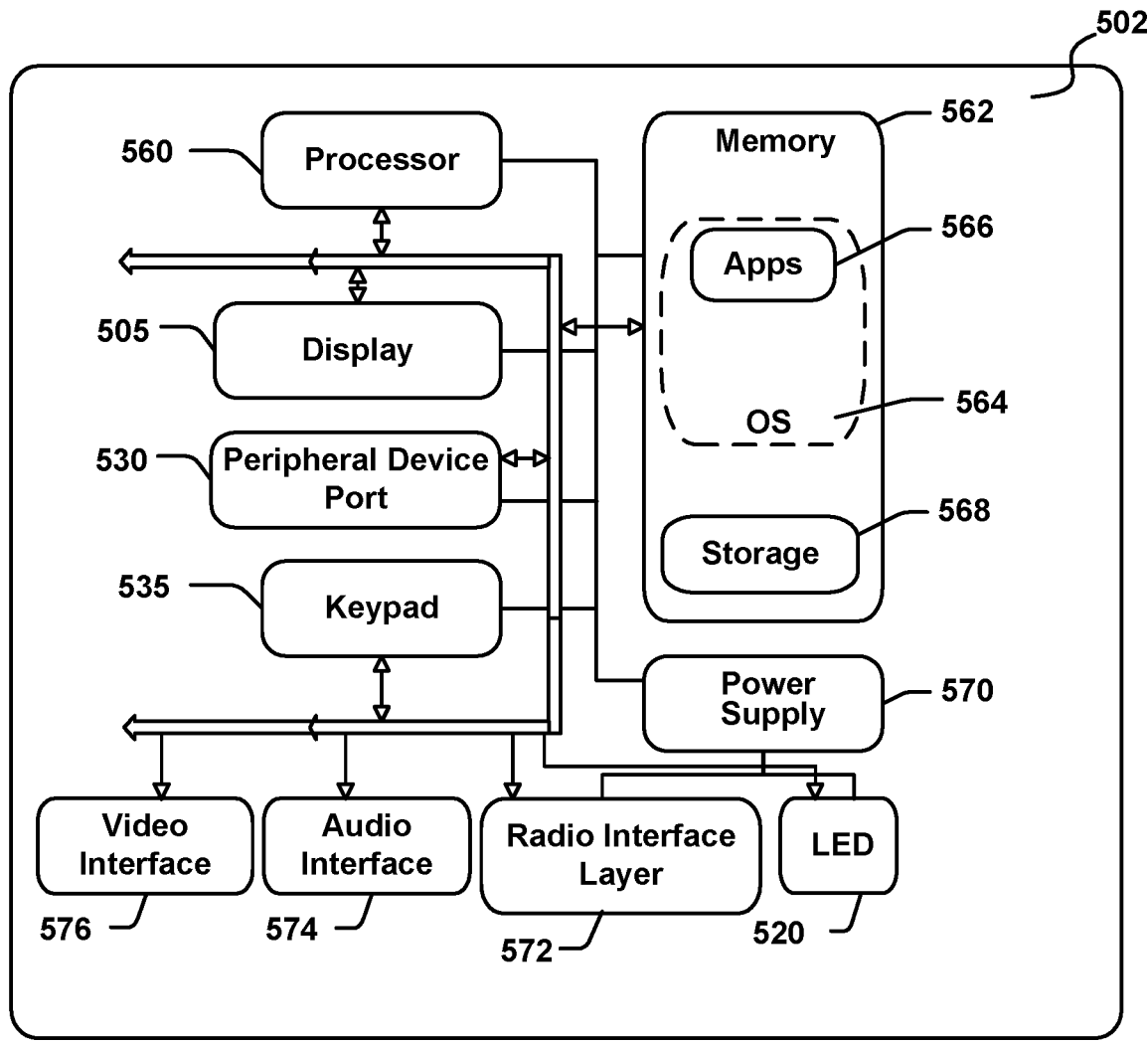

FIGS. 5A and 5B illustrate a mobile computing device 500, for example, a mobile telephone, a smart phone, a tablet personal computer, a laptop computer, and the like, with which embodiments of the disclosure may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
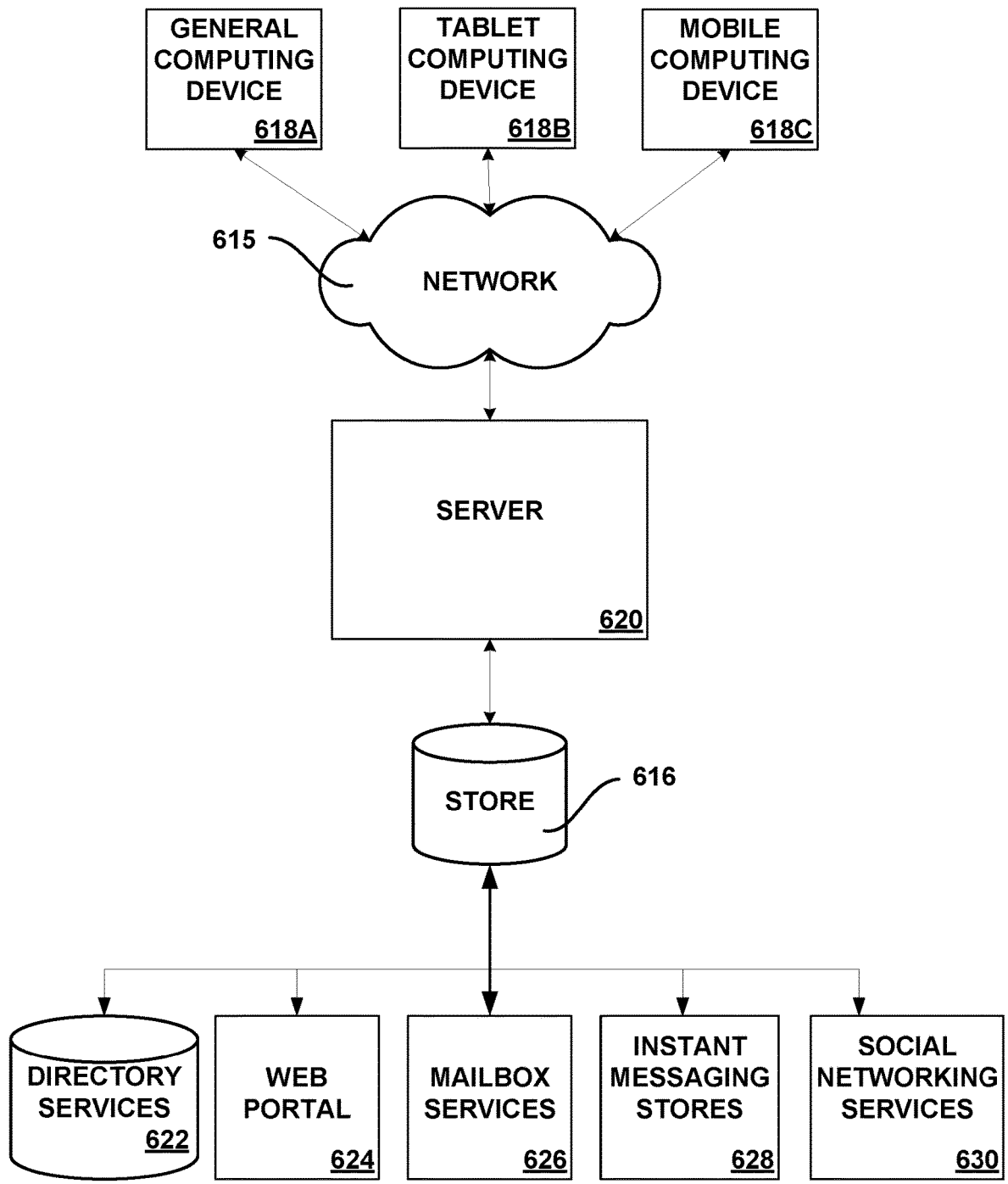
FIG. 6 is a simplified block diagram of a distributed computing system in which embodiments of the present disclosure may be practiced.

FIG. 6 illustrates one embodiment of the architecture of a system for providing applications to one or more client devices, as described above. Content developed, interacted with or edited in association with such applications may be stored in different communication channels or other storage types. For example, various documents may be stored using a directory service 622, a web portal 624, a mailbox service 626, an instant messaging store 628, or a social networking site 630. An email client application, for example, may use any of these types of systems or the like for enabling co-authoring conflict resolution via comments, as described herein. A server 620 may provide applications to the clients. As one example, the server 620 may be a web server providing an email client application over the web. The server 620 may provide the email client application over the web to clients through a network 615. By way of example, the client computing device 618 may be implemented as computing device 400 and embodied in a personal computer 618*a*, a tablet computing device 618*b* and/or a mobile computing device 618*c* (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing natural language query translation, the method comprising:
   receiving a spoken natural language query;
   translating the spoken natural language query into a search query according to a statistical model, wherein the statistical model is trained according to log data for a plurality of historical query result selections, and wherein the log data is mined to train the statistical model for domain detection in the absence of in-domain data;
   performing the translated search query; and
   providing at least one result associated with the translated search query.

2. The method of claim 1, wherein the statistical model is trained by identifying a plurality of domain independent salient phrases.

3. The method of claim 2, wherein each of the plurality of domain independent salient phrases comprises at least one word indicating that an associated search query comprises a natural language search query.

4. The method of claim 1, further comprising identifying a plurality of search queries associated with the log data that comprise natural language search queries according to the plurality of domain independent salient phrases.

5. The method of claim 4, further comprising generating a query pair by correlating at least one of the plurality of natural language search queries to at least one keyword-based search query.

6. The method of claim 5, wherein the correlation between the at least one of the plurality of natural language search queries and the at least one keyword-based search query is associated with a Uniform Resource Locator (URL) distribution.

7. The method of claim 6, wherein performing the search query comprises:
   searching the log data for a query pair corresponding to the search query; and
   identifying a domain associated with the search query according to the URL distribution.

8. A system comprising:
   a memory storage; and
   a processing unit coupled to the memory storage, wherein the processing unit is operable to:
      receive a spoken natural language query from a user,
      map the natural language query into a keyword-based query according to a statistical model, wherein the statistical model is trained according to log data for a plurality of historical query result selections, and wherein the log data is mined to train the statistical model for domain detection in the absence of in-domain data;
      perform a search according to a query pair comprising the spoken natural language query and the keyword-based query; and
      provide a plurality of results associated with the search to the user.

9. The system of claim 8, wherein the processor is further operative to:
   detect a domain associated with the spoken natural language query; and
   strip at least one domain-independent word from the spoken natural language query.

10. The system of claim 9, wherein the processor is further operative to:
    identify a subset of a plurality of possible domains according to at least one feature of the spoken natural language query.

11. The system of claim 10, wherein the at least one feature of the spoken natural language query comprises at least one of the following: a lexical feature, a contextual feature, a semantic feature, a syntactic feature, and a topical feature.

12. The system of claim 8, wherein the statistical model is trained according to a plurality of mined query pairs each comprising a previous natural language query and an associated previous keyword-based query.

13. The system of claim 12, wherein the previous natural language query is identified according to a domain independent salient phrase.

14. The system of claim 12, wherein the previous natural language query and the previous keyword-based query are associated according to a weighted Uniform Resource Locator (URL) graph.

15. The system of claim 12, wherein the mined query pairs each comprise a statistical weighting according to a semantic correlation between the previous natural language query and the previous keyword-based query.

16. A system for providing natural language query translation, the system comprising:
    a processor; and
    memory storing computer-readable instructions that when executed cause the processor to:
       receive a spoken natural language query;
       translate the spoken natural language query into a search query according to a statistical model, wherein the statistical model is trained according to log data for a plurality of historical query result selections, and wherein the log data is mined to train the statistical model for domain detection in the absence of in-domain data;
       perform the translated search query; and
       providing at least one result associated with the translated search query.

17. The system of claim 16, wherein the statistical model is trained according to a plurality of mined query pairs each comprising a previous natural language query and an associated previous keyword-based query.

18. The system of claim 17, wherein the previous natural language query is identified according to a domain independent salient phrase.

19. The system of claim 17, wherein the previous natural language query and the previous keyword-based query are associated according to a weighted Uniform Resource Locator (URL) graph.

20. The system of claim 17, wherein the plurality of mined query pairs each comprise a statistical weighting according to a semantic correlation between the previous natural language query and the previous keyword-based query.

* * * * *